(12) United States Patent
You (10) Patent No.: US 9,497,721 B2
(45) Date of Patent: Nov. 15, 2016

(54) UPLINK FREQUENCY CONTROL METHOD AND APPARATUS USING THE SAME

(71) Applicant: Electronics and Telecommunications Research Institute, Daejeon (KR)

(72) Inventor: Duk Hyun You, Seoul (KR)

(73) Assignee: Electronics and Telecommunications Research Institute, Daejeon (KR)

(*) Notice: Subject to any disclaimer, the term of this patent is extended or adjusted under 35 U.S.C. 154(b) by 140 days.

(21) Appl. No.: 14/037,928

(22) Filed: Sep. 26, 2013

(65) Prior Publication Data

US 2014/0086083 A1    Mar. 27, 2014

(30) Foreign Application Priority Data

Sep. 27, 2012  (KR) .................. 10-2012-0107695
Sep. 24, 2013  (KR) .................. 10-2013-0112949

(51) Int. Cl.
| | |
|---|---|
| H04W 56/00 | (2009.01) |
| H04L 1/20 | (2006.01) |
| H04L 27/26 | (2006.01) |
| H04W 72/04 | (2009.01) |

(52) U.S. Cl.
CPC .......... *H04W 56/0015* (2013.01); *H04L 1/205* (2013.01); *H04L 27/2657* (2013.01); *H04W 56/003* (2013.01); *H04W 56/0035* (2013.01); *H04W 72/0453* (2013.01)

(58) Field of Classification Search
CPC ............... H04L 1/205; H04L 27/2657; H04W 56/0015; H04W 56/0035; H04W 56/003; H04W 72/0453
See application file for complete search history.

(56) References Cited

U.S. PATENT DOCUMENTS

| | | | | |
|---|---|---|---|---|
| 4,494,238 | A  * | 1/1985 | Groth, Jr. ................. | 375/141 |
| 2006/0234737 | A1* | 10/2006 | Neumann et al. ............ | 455/502 |
| 2007/0058683 | A1 | 3/2007 | Futami et al. | |
| 2007/0211747 | A1 | 9/2007 | Kim | |
| 2009/0197535 | A1* | 8/2009 | Roh et al. ................. | 455/62 |
| 2013/0143503 | A1* | 6/2013 | Li .......................... | H04W 24/02 455/63.1 |
| 2013/0176952 | A1* | 7/2013 | Shin ......................... | H04L 5/001 370/329 |

FOREIGN PATENT DOCUMENTS

| | | |
|---|---|---|
| KR | 10-2007-0084780 | 8/2007 |
| KR | 10-2008-0002713 | 1/2008 |
| KR | 10-0893042 | 4/2009 |

* cited by examiner

*Primary Examiner* — Kwang B Yao
*Assistant Examiner* — Moo Ryong Jeong
(74) *Attorney, Agent, or Firm* — Nelson Mullins Riley & Scarborough LLP (57) ABSTRACT

Provided are an uplink frequency control method and a terminal apparatus using the same. The uplink frequency control method includes measuring a frequency offset with respect to a downlink, deriving a frequency offset component with respect to an uplink through the measured frequency offset, and correcting an uplink frequency offset using the derived frequency offset component. Therefore, by controlling an uplink frequency through a simple operation in a terminal, baseband design of a base station can be simplified, and uplink SNR performance can be improved.

6 Claims, 5 Drawing Sheets

UPLINK FREQUENCY CONTROL METHOD AND APPARATUS USING THE SAME

CLAIM FOR PRIORITY

This application claims priority to Korean Patent Application No. 10-2012-0107695, filed on Sep. 27, 2012 and No. 10-2013-0112949 filed on Sep. 24, 2013 in the Korean Intellectual Property Office (KIPO), the entire contents of which are hereby incorporated by reference.

BACKGROUND

1. Technical Field

Example embodiments of the present invention relate in general to frequency control, and more specifically to a method of controlling an uplink frequency that can be used in mobile communication or wireless communication, and a terminal device using the same.

2. Related Art

In recent times, an orthogonal frequency division multiple access (OFDMA) method or a single carrier-frequency division multiple access (SC-FDMA) method are being adopted in a variety of mobile communication technologies. IEEE 802.16, 802.20 of a portable Internet system and a standard of a Wibro system adopt the OFDMA method, and a cellular communication system referred to as long term evolution (LTE) adopts the OFDMA method and the SC-FDMA method in a 3rd generation partnership project (3GPP).

In a mobile communications system, Data is loaded into a radio frequency (RF) central frequency to be transmitted. In particular, in a case in which the OFDM method and the SC-FDMA are used, noise occurs in all packets transmitted when the RF central frequency does not exactly correspond between Tx and Rx, unavoidably deteriorating system performance. Therefore, in such a communication system, technology is generally used that transmits a prearranged reference signal in a particular resource space (specific frequency and specific time) so as to measure channel distortion and compensate for the measured distortion to eliminate noise occurring overall in the data.

In existing technology developed for a relatively low-speed mobile environment, even when a frequency offset is detected only in a downlink and the same value of frequency compensation applied to the downlink is applied to an uplink in order to compensate for channel distortion, compensation for channel distortion was possible without any problems. However, in a high-speed mobile environment, such a method in which the compensation value of the downlink is equally applied to the uplink becomes problematic due to the Doppler effect.

SUMMARY

Accordingly, example embodiments of the present invention are provided to substantially obviate one or more problems due to limitations and disadvantages of the related art.

Example embodiments of the present invention provide a method of controlling an uplink frequency.

Example embodiments of the present invention also provide a mobile terminal apparatus using the method of controlling an uplink frequency.

In some example embodiments, an uplink frequency control method includes: measuring a frequency offset with respect to a downlink; deriving a frequency offset component with respect to an uplink through the measured frequency offset; and correcting an uplink frequency offset using the derived frequency offset component.

Here, the frequency offset may include a frequency drift component and a Doppler frequency offset component.

Also, when the downlink includes more than two downlinks, the deriving may include deriving the frequency offset component with respect to the uplink from a difference between a frequency offset of a first downlink of the downlinks and a frequency offset of a second downlink of downlinks.

Also, the correcting may include calculating a quotient of the difference between the first downlink frequency offset and the second downlink frequency offset divided by a constant value, as a first Doppler frequency offset component, and setting a second Doppler frequency offset component to have the same magnitude and opposite sign as the first Doppler frequency offset component. The constant value may be 2 when the downlink comprises two downlinks.

Also, the correcting may include obtaining the first uplink frequency offset by adding or subtracting the first Doppler frequency offset component to or from the frequency drift component, and obtaining the second uplink frequency offset by adding or subtracting the second Doppler frequency offset component to or from the frequency drift component.

Also, the correcting may include calculating the second uplink frequency offset using the first Doppler frequency offset component, and calculating the first uplink frequency offset using the second Doppler frequency offset component.

Also, a measuring period with respect to the frequency drift component may be longer than a frequency offset measuring period including a Doppler frequency offset component.

In other example embodiments, a mobile terminal apparatus includes: a control unit configured to measure a frequency offset with respect to downlink comprising more the two downlinks, calculate a difference between the frequency offset of a first downlink of the downlinks and the frequency offset of a second downlink of the downlinks, derive a Doppler frequency offset component from the calculated difference between the frequency offsets, and compensate for an uplink frequency offset using the derived Doppler frequency offset component.

Here, the frequency offset may include a frequency drift component and the Doppler frequency offset component.

Also, the control unit may correct an uplink frequency offset by setting a quotient of the difference between the frequency offset of the first downlink and the frequency offset of the second downlink divided by a constant value as a first Doppler frequency offset component and setting a second Doppler frequency offset component to have the same magnitude and opposite sign as the first Doppler frequency offset component. The constant value may be 2 when the downlink comprises two downlinks.

Also, the control unit may correct the uplink frequency offset by calculating a second uplink frequency offset using the first Doppler frequency offset component and a first uplink frequency offset using the second Doppler frequency offset component.

Also, the control unit may obtain the second uplink frequency offset by adding the frequency drift component to the first Doppler frequency offset component.

Also, the control unit may obtain the first uplink frequency offset by adding the frequency drift component to the second Doppler frequency offset component.

Also, the frequency drift component may be derived by measuring the frequency offset when signal quality of a first link and signal quality of a second link are similar to each other.

Also, the signal quality may be determined by a signal-to-noise ratio (SNR) of each link.

Also, a measuring period with respect to the frequency drift component may be sufficiently longer than a frequency offset measuring period including a Doppler frequency offset component.

In other example embodiments, a mobile terminal apparatus includes: a control unit configured to measure a frequency offset with respect to a downlink, derive a frequency offset component with respect to an uplink through the measured frequency offset, and correct an uplink frequency offset using the derived frequency offset component.

Here, the frequency offset may include a frequency drift component and a Doppler frequency offset component.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternative forms and should not be construed as limited to the example embodiments set forth herein.

Accordingly, while the invention can be modified in various ways and take on various alternative forms, specific embodiments thereof are shown in the drawings and described in detail below as examples. there is no intent to limit the invention to the particular forms disclosed. on the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

"Terminal" may be used in the present specification in reference to a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other devices.

A variety of examples of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and playback appliances having a communication function, Internet appliances enabling wireless Internet access and browsing, and portable units or terminals in which combinations of the these functions are integrated, etc.

"Base station" used in the present application generally refers to a fixed or moving point that communicates with a terminal, and may be a collective name for a base station, a node-B, an eNode-B, a base transceiver system (BTS), an access point, a relay, a femtocell, and the like.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

Figure 1:
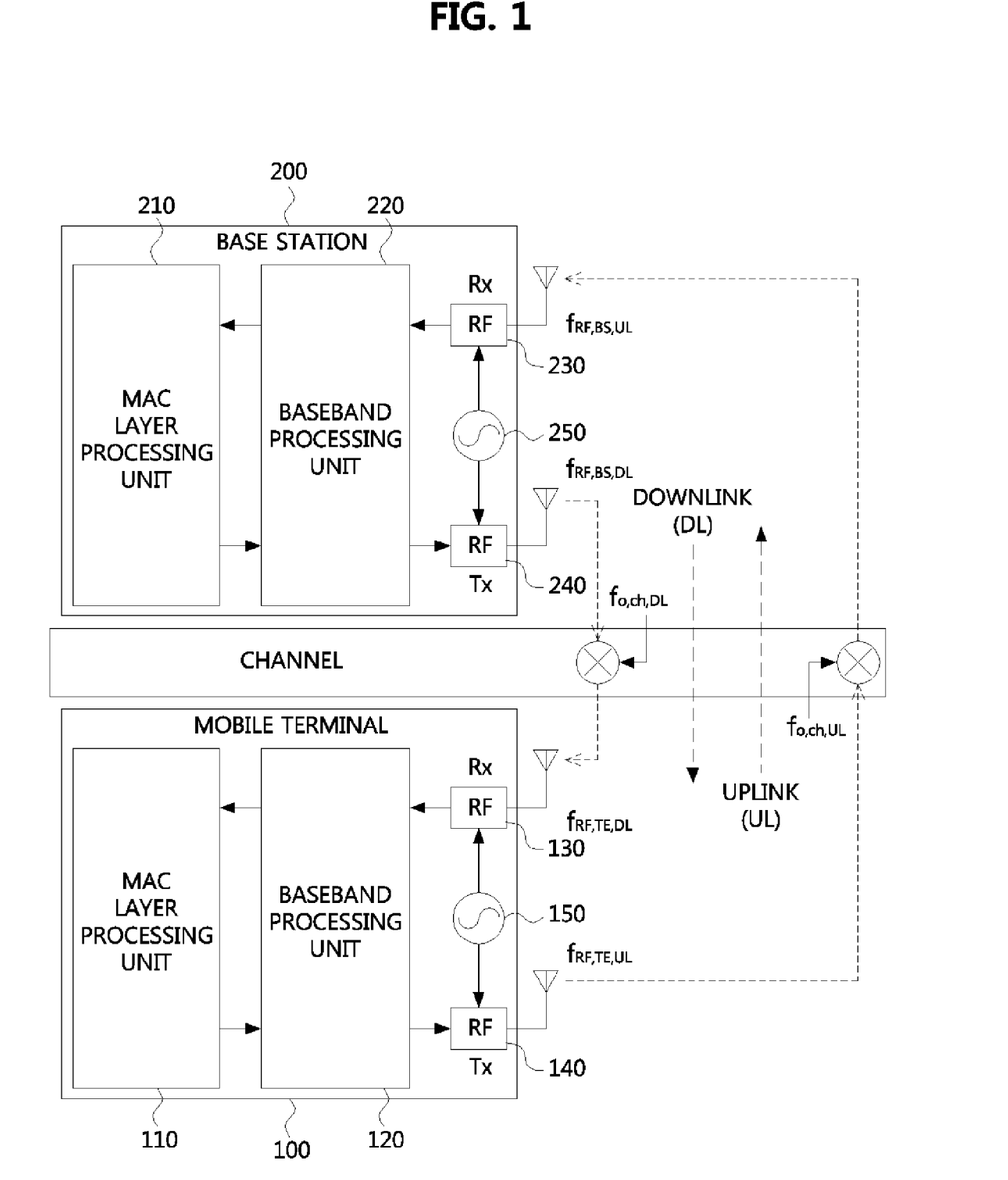
FIG. 1 is a flowchart illustrating a block configuration of a base station and a terminal, and a related signal diagram, for describing concepts of typical frequency offset detection and compensation.

FIG. 1 is a flowchart illustrating a block configuration of a base station and a terminal, and a related signal diagram, for describing concepts of typical frequency offset detection and compensation.

A terminal shown in FIG. 1 includes a medium access control (MAC) layer processing unit 110, a baseband processing unit 120, an RF transmission unit 130, an RF reception unit 140, and a local oscillator 150.

The MAC layer processing unit 210 of the base station provides services to an upper layer in the form of a logical channel, and is mainly responsible for data retransmission and uplink and downlink scheduling. For the uplink and the downlink, a single MAC entity per cell is provided. The MAC layer processing unit 110 of a terminal also provides services to the upper layer and is responsible for data retransmission.

The baseband processing units 120 and 220 of the base station and the terminal are responsible for processes for the baseband such as coding/decoding, modulation/demodulation, and the like.

The RF transmission units 130 and 230 of the base station and the terminal convert digital signals output by the baseband processing unit 220 into analog signals to transmit the analog signals, and the RF reception units 130 and 230 of the base station and the terminal receive the analog signals to convert the received signals into digital signals to transmit the digital signals to each of the baseband processing units.

In addition, each of the local oscillators 150 and 250 generates signals matching a predetermined frequency to supply the generated signals to the RF transmission unit and the RF reception unit.

each frequency component shown in FIG. 1 is defined in the following Equations 1 to 4.

A downlink frequency offset $f_{o,DL}(t)$ may be represented as the following Equations 1, and an uplink frequency offset $f_{o,UL}(t)$ may be represented as the following Equations 2.

$$f_{o,DL}(t) = f_{RF,DL}(t) - f_{RF,TE,DL}(t)$$

$$f_{o,DL}(t) = f_{RF,BS,DL}(t) + f_{o,ch,DL}(t) - f_{RF,TE,DL}(t)$$

$$f_{o,DL}(t) = f_{o,RF,DL}(t) + f_{o,ch,DL}(t)$$

$$f_{o,DL}(t) \approx f_{o,drift}(t) + f_{o,ch,DL}(t) \quad \text{[Equations 1]}$$

In Equations 1, $f_{RF,BS,DL}(t)$ denotes an RF frequency of a base station downlink (DL), $f_{o,ch,DL}(t)$ denotes a frequency offset that occurs through a downlink channel, $f_{RF,DL}(t)$ denotes a frequency of signals received by a terminal, $f_{o,RF,DL}(t)$ denotes a RF downlink frequency offset between a base station and a terminal, $f_{RF,TE,DL}(t)$ denotes an RF frequency of a terminal downlink (DL), and $f_{o,drift}(t)$ denotes a drift error.

$$f_{o,UL}(t) = f_{RF,UL}(t) - f_{RF,TE,UL}(t)$$

$$f_{o,UL}(t) = f_{RF,BS,UL}(t) - f_{o,ch,UL}(t) - f_{RF,TE,UL}(t)$$

$$f_{o,UL}(t) = f_{o,RF,UL}(t) - f_{o,ch,DL}(t)$$

$$f_{o,UL}(t) \approx f_{o,drift}(t) - f_{o,ch,DL}(t) \quad \text{[Equations 2]}$$

Here, $f_{RF,TE,UL}(t)$ denotes an RF frequency of a terminal uplink (UL), $f_{o,ch,UL}(t)$ denotes a frequency offset that occurs through an uplink channel, $f_{RF,UL}(t)$ denotes a frequency of signals received by a base station, $f_{o,RF,UL}(t)$ denotes a RF uplink frequency offset between a base station and a terminal, and $f_{RF,BS,UL}(t)$ denotes an RF frequency of a base station uplink.

In addition, an RF frequency offset in each of the downlink and the uplink may be represented as the following Equations 3.

$$f_{o,RF,DL}(t) = f_{RF,BS,DL}(t) - f_{RF,TE,DL}(t) \approx f_{o,drift}(t)$$

$$f_{o,RF,UL}(t) = f_{RF,BS,UL}(t) - f_{RF,TE,UL}(t) \approx f_{o,drift}(t) \quad \text{[Equations 3]}$$

From Equations 3, it can be seen that each of the RF frequency offset in the downlink and the RF frequency offset in the uplink generally has a value that approximates a frequency drift offset value.

The reason why frequency drift values of the uplink and the downlink are the same in Equations 3 is because signals from the same single local oscillator 150 are applied to the RF transmission unit 140 and the RF reception unit 130 of a terminal as shown in FIG. 1.

In addition, a channel frequency offset $f_{o,ch,DL}(t)$ in the downlink and a channel frequency offset $f_{o,ch,UL}(t)$ in the uplink can be represented as the following Equations 4, and the channel frequency offset generally corresponds to a Doppler frequency change and is in proportional to a moving speed.

$$f_{o,ch,DL}(t) = f_{o,doppler,DL}(t)$$

$$f_{o,ch,UL}(t) = f_{o,doppler,UL}(t) \quad \text{[Equations 4]}$$

Typically, when detecting and compensating for the frequency offset, a method in which overall channel distortion is measured to detect a difference of RF central frequencies between Tx and Rx, low-pass filtering is performed to obtain a value to be newly set, and then a frequency changed by the obtained value is used. Such a method is generally used in a downlink in a low-speed environment, and in a case of an uplink, a particular frequency control algorithm is not used.

Figure 2:
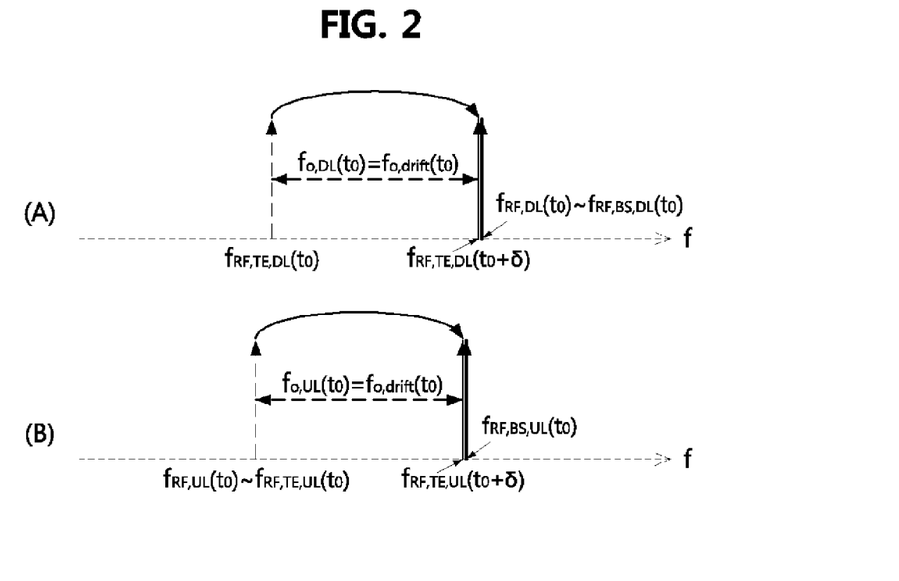
FIG. 2 is a conceptual diagram illustrating downlink and uplink frequency offsets in a low-speed environment.

FIG. 2 is a conceptual diagram illustrating downlink and uplink frequency offsets in a low-speed environment.

In FIG. 2, an upper graph (a) shows a frequency offset in a downlink, a lower graph (b) shows a frequency offset in an uplink, and a horizontal axis of each graph indicates a frequency component.

In the upper graph (a) of FIG. 2, an RF frequency component value $f_{RF,BS,DL}$ of a base station in a downlink and an RF frequency component value $f_{RF,TE,DL}$ of a terminal in the downlink are shown along a frequency axis. In the upper graph (a), $f_{o,DL}$ indicates a downlink frequency offset.

In addition, in the lower graph (b) of FIG. 2, an RF frequency component value $f_{RF,BS,UL}$ of a base station in an uplink and an RF frequency component value $f_{RF,TE,UL}$ of a terminal in the uplink are shown, and $f_{o,UL}$ indicates an uplink frequency offset.

From the graphs of FIG. 2, it can be seen that most frequency noise components in a low-speed environment depend on a frequency a drift error component that occurs in a local oscillator (or phase locked loop (PLL)). This can be seen from the fact that a relationship of $f_{o,DL} = f_{o,UL} = f_{o,drift}$ is established when $f_{o,ch}$ is significantly small in Equations 1 and 2.

Therefore, as shown in FIG. 2, it can be seen that the frequency offsets of the uplink and the downlink are in the same direction and magnitudes thereof are also the same, and therefore even though AFC is applied only to the downlink in such a low-speed environment, it is not a big problem.

Such a frequency drift error can be modeled as a step function and changed while having a very long period of time compared to an AFC control period, whereby the frequency drift error may be sufficiently corrected. Therefore, there is no particular problem in normal operation of the terminal even when such a frequency offset correction method is employed in the low-speed environment.

Figure 3:
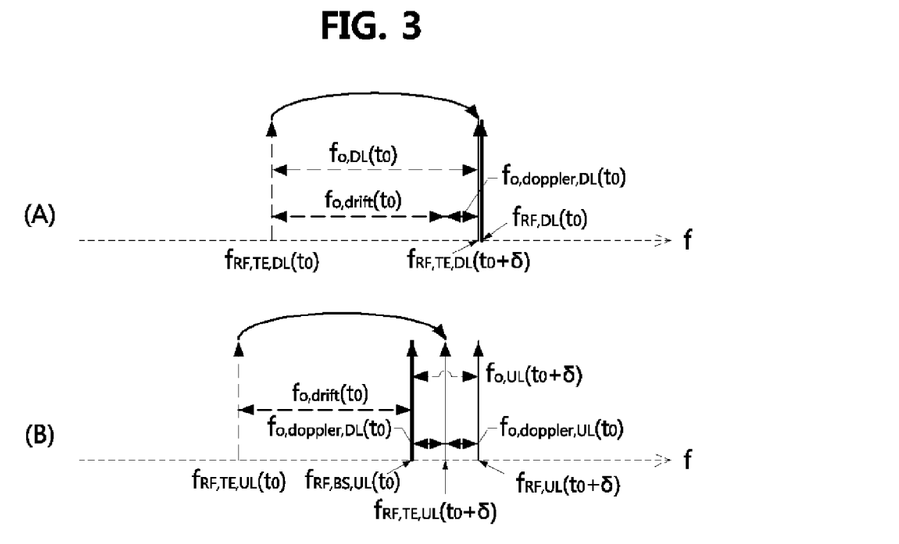
FIG. 3 is a conceptual diagram illustrating downlink and uplink frequency offsets in a high-speed environment.

FIG. 3 is a conceptual diagram illustrating a frequency offset in a high-speed environment.

In FIG. 3, a frequency offset that occurs in an environment in which a terminal moves at a high speed is shown.

In FIG. 3, a horizontal axis indicates a frequency component, an upper graph (a) of FIG. 3 shows a frequency offset in a downlink, and a lower graph (b) of FIG. 3 shows a frequency offset in an uplink.

In the graph (a) that shows a case of the downlink, an RF frequency component value $f_{RF,BS,DL}$ of a base station and an RF frequency component value $f_{RF,TE,DL}$ of a terminal are both shown along a frequency axis. In the graph (a), $f_{o,DL}$ indicates the downlink frequency offset. In lower the graph (b) of FIG. 2, an RF frequency component value $f_{RF,BS,UL}$ of a base station in the uplink and an RF frequency component value $f_{RF,TE,UL}$ of a terminal are shown, and $f_{o,UL}$ indicates the uplink frequency offset.

In a high-speed environment, unlike a low-speed environment, a Doppler frequency shift component $f_{o,doppler}$ which is generated while a terminal moves at a high speed, as well as a frequency drift error component $f_{o,drift}$, may be generated as frequency offset components.

Thus, appropriate uplink compensation cannot be achieved through a simple method in which the uplink is moved in the same direction and by the same amount as the downlink, as shown in FIG. 2. That is, since $f_{o,DL} \neq f_{o,UL}$, the same frequency compensation method applied to the downlink cannot also be applied to the uplink.

When an uplink frequency axis is moved in the same direction and by the same amount as a frequency offset of the downlink so as to compensate for a frequency offset of the uplink, components in which two Doppler shift components (Doppler shift shown passing through the downlink and Doppler shift shown passing through the uplink) and the frequency drift component are combined appear at the base station.

Meanwhile, since the base station generally receives a plurality of users, it is necessary to measure a different frequency offset for each user and then individually compensate for the frequency offset. Since such an operation is not easy to process in an RF terminal, such compensation is performed mainly in the baseband processing unit 220 of the base station, which may significantly increase design complexity of the baseband processing unit of the base station.

In order to overcome this problem and allow the uplink to operate with normal performance, according to an embodiment of the present invention, the frequency offset may be measured in the downlink, and the frequency drift component and the Doppler frequency offset component may be obtained based on the measured frequency offset. Next, the Doppler frequency offset component may be applied in the opposite direction as the downlink considering additional Doppler frequency shift which occurs while passing through an uplink channel to thereby compensate for the frequency offset.

Thus, an automatic frequency prediction and control method and apparatus according to an embodiment of the present invention can more accurately perform RF central frequency control by reducing errors of a general automatic frequency prediction and control apparatus in a high-speed mobile environment, thereby providing a superior channel environment to the existing channel environment in the high-speed mobile environment. Thus, uplink data can be modulated even without applying a separate algorithm to the baseband processing unit of the base station, and high-order modulation can be performed so that a retransmission frequency is reduced to transmit a larger amount of data.

to aid in understanding the present invention, a frequency environment resulting from high-speed movement of a mobile terminal will be first described.

A Doppler frequency shift in the high-speed mobile environment may be defined by the following Equations 5 and 6.

$$f_{o,doppler}(t) = f_{d\,max} \cdot \cos\theta(t) \qquad \text{[Equation 5]}$$

$$f_{d\,max} = \frac{v \cdot f_{RF}}{c} \qquad \text{[Equation 6]}$$

In this instance, $f_{o,doppler}(t)$ denotes a Doppler frequency shift, $f_{d\,max}$ denotes a maximum Doppler spread, and $\theta$ denotes an angle between a moving terminal device and a base station. In addition, c denotes the speed of light, $f_{RF}$ denotes a carrier frequency, and v denotes the speed of a terminal.

Equations 5 and 6 are applicable in a line of sight (LOS) environment, and are generalized to show a Doppler frequency spread in a non-line of sight (NLOS) environment. The Doppler frequency spread in the NLOS environment may be corrected via a statistical method using measurement, but this may also increase complexity of a correction circuit. In general, since communication is common in an environment with ensured LOS in the high-speed mobile environment, only Doppler shift type may be considered in the present invention. However, when the frequency offset is reliably measured even in the NLOS environment, there is no difficulty at all in using the present invention.

Figure 4:
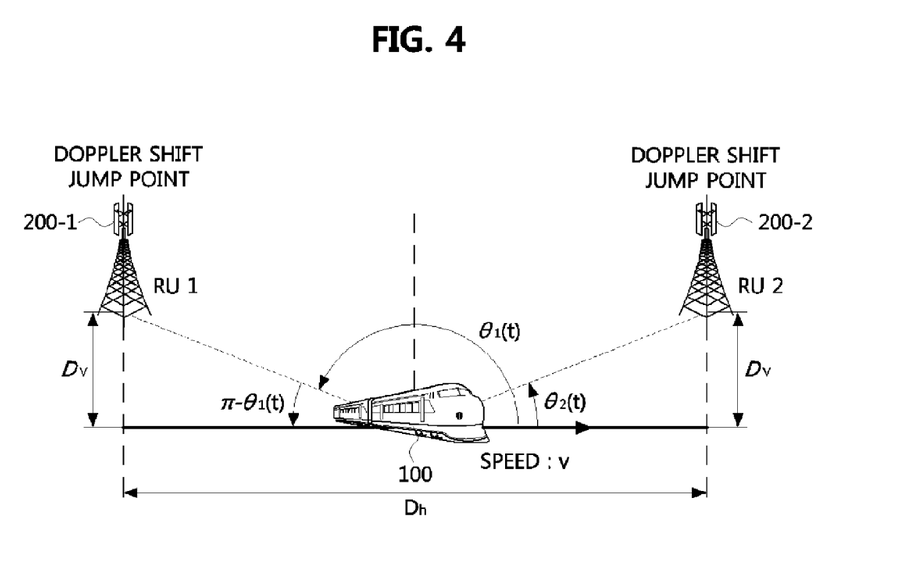
FIG. 4 is a diagram illustrating a cell deployment scenario in a general high-speed environment.

FIG. 4 is a diagram illustrating a cell deployment scenario in a general high-speed environment.

In FIG. 4, it is assumed that a mobile terminal 100 leaves a base station 1 (200-1) and moves toward a base station 2 (200-2) at a speed of v.

In this instance, $\theta_1$ indicates an angle up to the base station 1 (200-1) with respect to a horizontal direction in which the mobile terminal 100 moves, and $\theta_2$ indicates an angle up to the base station 2 (200-2) with respect to the horizontal direction in which the mobile terminal 100 moves. In addition, Dv indicates a vertical distance up to the base station with respect to a line parallel to the direction in which the mobile terminal 100 moves, and Dh indicates a distance between the base station 1 (200-1) and the base station 2 (200-2).

Based on the cell development scenario shown in FIG. 4, a cosine component included in a Doppler shift formula shown in Equations 5 and 6 may be represented as the following Equations 7.

$$\cos\theta_1(t) = \begin{cases} \dfrac{v \cdot t}{\sqrt{D_v^2 + (v \cdot t)^2}}, & 0 \leq t \leq \dfrac{D_h}{v} \\ \cos\theta_1(t \bmod(D_h/v)), & t > \dfrac{D_h}{v} \end{cases}$$

$$\cos\theta_2(t) = \begin{cases} \dfrac{D_h/2 - v \cdot t}{\sqrt{D_v^2 + (D_h - v \cdot t)^2}}, & 0 \leq t \leq \dfrac{D_h}{v} \\ \cos\theta_2(t \bmod(D_h/v)), & t > \dfrac{D_h}{v} \end{cases}$$

[Equations 7]

In Equations 7, v denotes a moving speed, Dv denotes a vertical distance from a mobile terminal to the base station 2 (200-2), and Dh denotes a distance between the base station 1 (200-1) and the base station 2 (200-2).

In Equations 7, when it is assumed that the number of links between a terminal and a base station is 2, cosine components with respect to angles $\theta_1$ and $\theta_2$ in each link are considered. There may be a variety of reasons why the number of links is 2, but the main reason is to distinguish a frequency drift component and a Doppler frequency shift component which are described above. In addition, a method of assuming that the number of links is 2 can be applicable in a variety of schemes such as DAS-MIMO, multi-flow, and the like, so that data throughput may be increased.

On the other hand, the method of assuming that the number of links is 2 may be used to distinguish the frequency drift component and the Doppler frequency shift component, and such a method is not necessarily the only method that can be used. The present invention includes all embodiments in which the number of links is at least two so that a terminal can distinguish the frequency drift component and the Doppler frequency shift component. Thus, the above-described method of assuming that the number of links is 2 is merely an embodiment according to the present invention.

Figure 5:
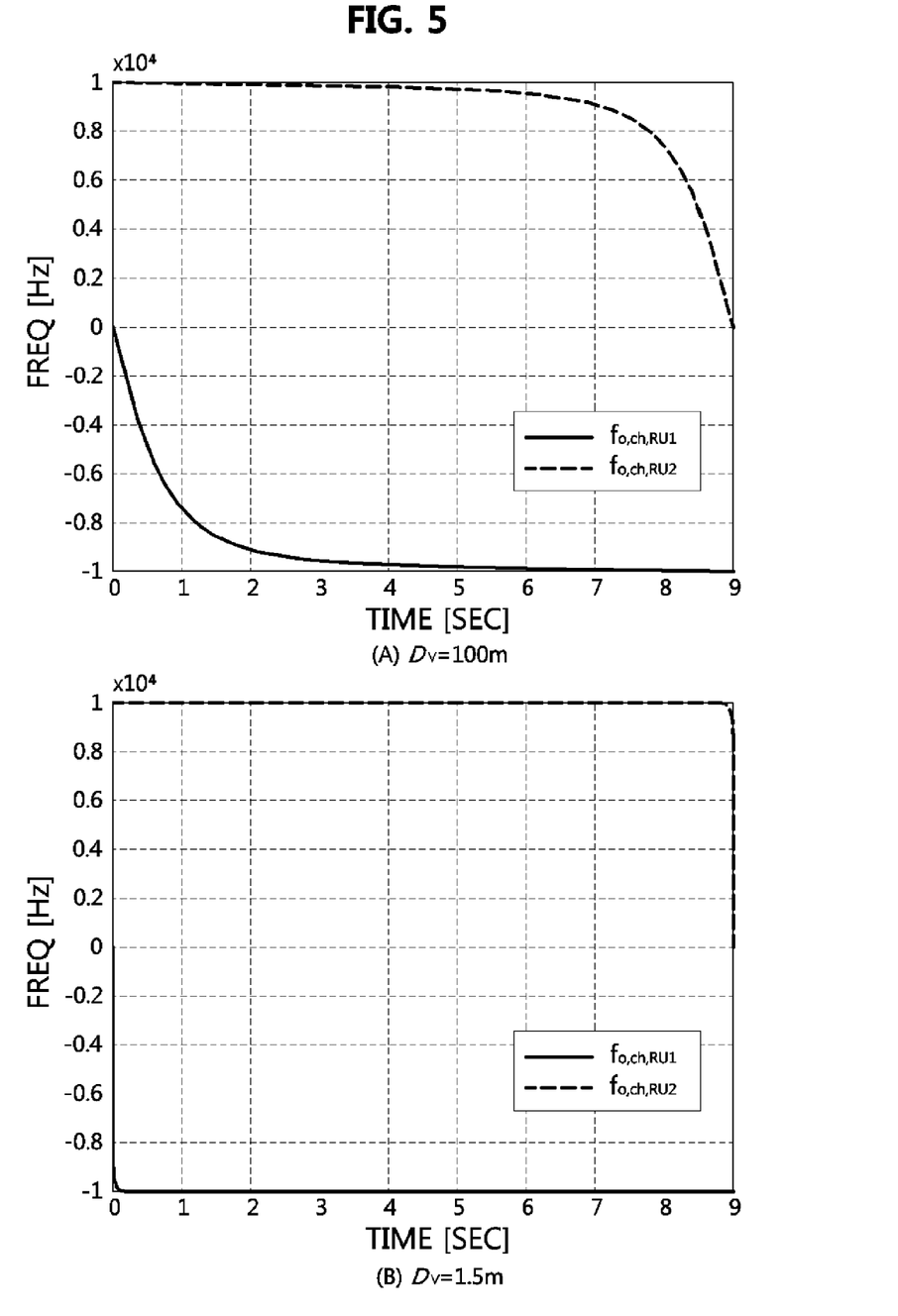
FIG. 5 is a diagram illustrating an example of a time change of a Doppler frequency offset.

FIG. 5 is a diagram illustrating an example of a time change of a Doppler frequency offset.

the graph of FIG. 5 shows, with reference to Equations 7, a time change of a Doppler frequency offset when v=400 km/h and Dh=1 km in the scenario shown in FIG. 4 and a central frequency is set as 27 GHz.

In the graph shown in FIG. 5, a horizontal axis denotes time, a vertical axis denotes a Doppler frequency offset, a graph (a) of FIG. 5 denotes a case of Dv=100 m, and a graph (b) of FIG. 5 denotes a case of Dv=1.5 m.

In the graph (b) of the graphs of FIG. 5, in most time intervals, it can be seen that a Doppler frequency offset $f_{o,ch,RU1,DL}(t)$ with respect to a link 1 and a Doppler frequency offset $f_{o,ch,RU2,DL}(t)$ with respect to a link 2 have the same magnitude but opposite signs. From this, the following Equation 8 may be established. In addition, it can be seen that a ratio of such an interval in which the Doppler frequency offsets have the same magnitude but opposite signs may be increased as the base station approaches the path of movement (that is, as a value of Dv is smaller).

$$f_{o,ch,RU1,DL}(t) = -f_{o,ch,RU2,DL}(t) \quad \text{[Equation 8]}$$

In a real situation, a component $f_{o,drift}(t)$ due to frequency drift may be additionally applied to Equation 8 as offset, and when this is expressed as formulas for an uplink and a downlink, the following Equations 9 and 10 are obtained.

$$f_{o,RU1,DL}(t) = f_{o,drift}(t) + f_{o,ch,RU1,DL}(t)$$

$$f_{o,RU1,DL}(t) = f_{o,drift}(t) - f_{o,ch,RU2,DL}(t) \quad \text{[Equations 9]}$$

$$f_{o,RU2,DL}(t) = f_{o,drift}(t) + f_{o,ch,RU2,DL}(t)$$

$$f_{o,RU2,DL}(t) = f_{o,drift}(t) - f_{o,ch,RU1,DL}(t) \quad \text{[Equations 10]}$$

Here, $f_{o,RU1,DL}(t)$ denotes a downlink offset frequency in the link 1, and $f_{o,RU2,DL}(t)$ denotes a downlink offset frequency in the link 2.

In Equations 9 and 10, the frequency drift component is commonly applied to the link 1 and the link 2, and the Doppler frequency shift component is applied differently for each link.

Thus, the most ideal uplink frequency offset compensation utilizing the downlink frequency components may be represented as the following Equations 11 and 12.

$$f_{o,RU1,UL,ideal}(t) = f_{o,drift}(t) - f_{o,ch,RU1,UL}(t) \quad \text{[Equation 11]}$$

$$f_{o,RU2,UL,ideal}(t) = f_{o,drift}(t) - f_{o,ch,RU2,UL}(t) \quad \text{[Equation 12]}$$

According to an embodiment of the present invention based on Equations 9, 10, 11, and 12, it can be seen that the uplink and downlink frequency components should share and include only the frequency drift component, and the Doppler frequency shift component should vary in magnitude and direction.

However, typically, an RF central frequency difference between the downlink and the uplink is significantly small compared to the RF central frequency itself, and therefore the following Equations 13 may be obtained.

$$|f_{RF,DL}(t) - f_{RF,UL}(t)| \ll f_{RF,DL}(t)$$

$$|f_{RF,DL}(t) - f_{RF,UL}(t)| \ll f_{RF,UL}(t) \quad \text{[Equations 13]}$$

In addition, when Equations 13 are considered together with Equation 6, it can be seen that the magnitudes of the Doppler frequency shifts that occur in the uplink and the downlink are similar, as shown in the following Equation 14.

$$f_{o,ch,DL}(t) \approx f_{o,ch,UL}(t) \quad \text{[Equation 14]}$$

Thus, the ideal uplink frequency offset compensation may be also expressed as the following Equations 15 and 16.

$$f_{o,RU1,UL,ideal}(t) = f_{o,drift}(t) - f_{o,ch,RU1,DL}(t) \quad \text{[Equation 15]}$$

$$f_{o,RU2,UL,ideal}(t) = f_{o,drift}(t) - f_{o,ch,RU2,DL}(t) \quad \text{[Equation 16]}$$

Thus, according to an embodiment of the present invention based on Equations 9, 10, 15, and 16, it can be seen that, even when the downlink and uplink frequency components share and include the frequency drift and the Doppler frequency shift component varies only in direction and not in magnitude, the same effect as ideal uplink frequency offset compensation may be exhibited in a typical environment.

Here, a method of correcting the uplink frequency offset is performed in such a manner that a frequency offset is measured in each downlink, a difference of the measured values is obtained, a Doppler frequency offset component of each link is calculated from the difference, and the calculated Doppler frequency offset component is subtracted from the entire frequency offset of each downlink. That is, the method of correcting the uplink frequency offset is performed in such a manner that an uplink Doppler frequency shift value is predicted from the measured downlink frequency offset, and correction is performed in the opposite direction.

This method may be represented as the following Equations 17 and 18 with respect to the link 1 and the link 2.

$$f_{o,RU1,UL}(t) = f_{o,drift}(t) - f_{o,ch,RU1,DL}(t) = f_{o,RU1,DL}(t) - 2f_{o,ch,RU1,DL}(t)$$

$$f_{o,RU1,DL}(t) - f_{o,RU2,DL}(t) = f_{o,ch,RU1,DL}(t) - f_{o,ch,RU2,DL}(t) = 2f_{o,ch,RU1,DL}(t)$$

$$f_{o,RU1,UL}(t) = f_{o,RU1,DL}(t) - (f_{o,RU1,DL}(t) - f_{o,RU2,DL}(t)) \quad \text{[Equations 17]}$$

$$f_{o,RU2,UL}(t) = f_{o,drift}(t) - f_{o,ch,RU2,DL}(t) = f_{o,RU2,DL}(t) - 2f_{o,ch,RU2,DL}(t)$$

$$f_{o,RU2,DL}(t) - f_{o,RU1,DL}(t) = f_{o,ch,RU2,DL}(t) - f_{o,ch,RU1,DL}(t) = 2f_{o,ch,RU2,DL}(t)$$

$$f_{o,RU2,UL}(t) = f_{o,RU2,DL}(t) - (f_{o,RU2,DL}(t) - f_{o,RU1,DL}(t)) \quad \text{[Equations 18]}$$

Such a method is obtained by utilizing the facts that changes in the Doppler frequency over time have similar magnitudes to each other in almost all intervals, and the Doppler frequencies with respect to the link 1 and the link 2 have similar magnitudes and opposite signs to each other.

In addition, the uplink frequency offset may be corrected such that when the number of links is 2, the frequency offset of each link is measured, and the measured frequency offset is used to control the uplink frequencies of other links. That is, the downlink frequency offset of the link 1 is utilized in controlling the uplink frequency of the link 2, and the downlink frequency offset of the link 2 is utilized in controlling the uplink frequency of the link 1.

The reason this is possible can be understood through the following Equations 19 and 20. Consequently, this method is an embodiment obtained by optimizing the method of correcting the uplink frequency offset according to the present invention with respect to a case in which the number of links is 2.

$$f_{o,RU1,UL}(t) = f_{o,drift}(t) - f_{o,ch,RU1,DL}(t)$$

$$f_{o,RU2,DL}(t) = f_{o,drift}(t) + f_{o,ch,RU2,DL}(t)$$

$$f_{o,RU2,DL}(t) - f_{o,drift}(t) - f_{o,ch,RU1,DL}(t)$$

$$f_{o,RU1,UL}(t) \sim f_{o,RU2,DL}(t) \quad \text{[Equations 19]}$$

$$f_{o,RU2,UL}(t) = f_{o,drift}(t) - f_{o,ch,RU2,DL}(t)$$

$$f_{o,RU1,DL}(t) = f_{o,drift}(t) + f_{o,ch,RU1,DL}(t)$$

$$f_{o,RU1,DL}(t) - f_{o,drift}(t) - f_{o,ch,RU2,DL}(t)$$

$$f_{o,RU2,UL}(t) \sim f_{o,RU1,DL}(t) \quad \text{[Equations 20]}$$

On the other hand, according to another embodiment for compensating for distortion of the uplink frequency, the frequency offset may be measured at a point in time when a magnitude of a signal-to-noise ratio (SNR) of each link is similar, or a point in time (intermediate point between base stations, or the like) when it is sure that the Doppler frequency offsets have the same magnitude but opposite directions, the measured frequency offset may be set and used as a common component (that is, frequency drift offset) for a predetermined period, and the remaining error (drift) component (that is, Doppler frequency offset) may be frequently measured and calculated to be used.

As described above, since the common component changes very slowly over time, it is sufficient to measure the common component only once every several or several dozen seconds. For example, as described above, operation at a satisfactory level of performance may be possible even when the common component is measured every time each base station is changed (for example, once every nine seconds in a case in which v=400 km/h and Dh=1 km are satisfied).

As described above, a variety of uplink frequency offset control methods according to the present invention may be provided. The present invention includes a variety of embodiments concerning a method in which common (frequency drift) components and differential (Doppler frequency offset) components are distinguished using a variety of methods in the downlink, and the uplink is controlled using the common component having the same magnitude and direction as the downlink and the differential component having the same magnitude but different direction.

Figure 6:
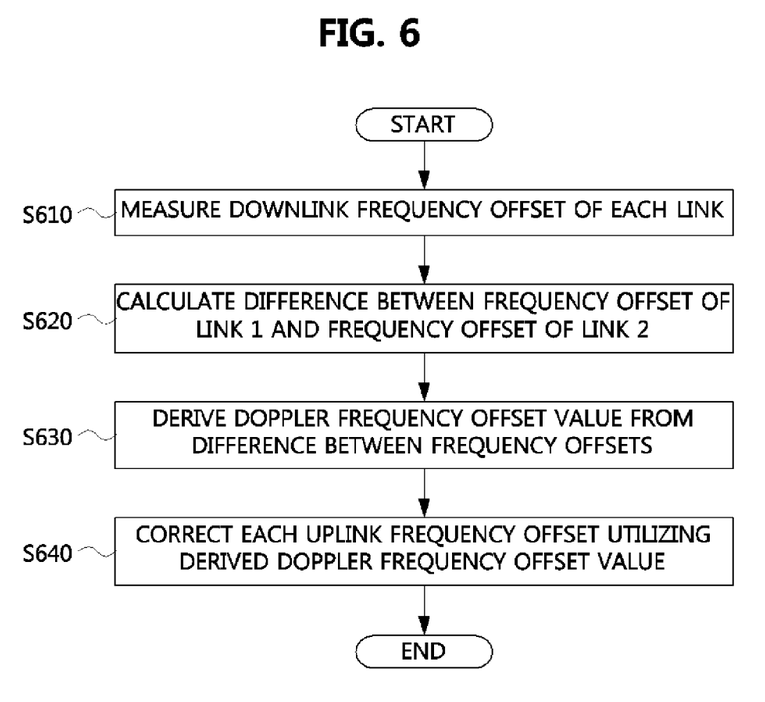
FIG. 6 is a flowchart illustrating a method for correcting an uplink frequency according to an embodiment of the present invention.

FIG. 6 is a flowchart illustrating a method for correcting an uplink frequency according to an embodiment of the present invention.

In the following description of the embodiment, each operation constituting the uplink frequency compensating method according to the present invention may be performed by a corresponding component of the mobile terminal which will be described with reference to FIG. 7. However, the method according to the present invention is not limited in any way by any apparatus proposed to execute it.

According to an embodiment of the uplink frequency compensation method measures a frequency offset of each downlink is measured. In this instance, the measured downlink frequency offset includes a frequency drift component and a Doppler frequency offset component.

In operation S620, when the frequency offset of each link is measured, a difference value between the frequency offset of the link 1 and the frequency offset of the link 2 is calculated. In operation S630, when the difference value is calculated, a Doppler frequency offset component is derived from the calculated difference value between the frequency offsets.

In operation S640, each uplink frequency offset is corrected utilizing the Doppler frequency offset component.

In addition, as described above, when the number of links is 2, operations S620 and S630 may be omitted, so that operation S610 is followed by operation S640. That is, each downlink frequency offset may be measured, and the measured downlink frequency offset may be used to control the uplink frequencies of other links.

Figure 7:
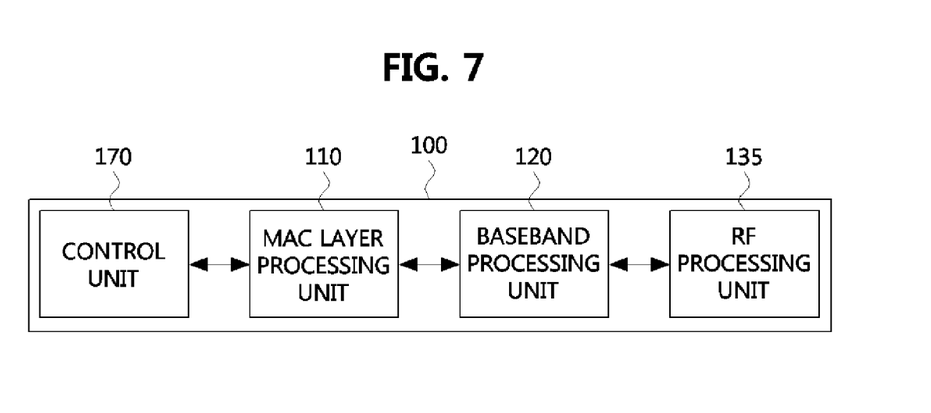
FIG. 7 is a block diagram illustrating a mobile terminal for performing uplink frequency correction according to an embodiment of the present invention.

FIG. 7 is a block diagram illustrating a mobile terminal for performing uplink frequency correction according to an embodiment of the present invention.

Herein, components may be characterized by their functions rather than physical properties. Each component may be implemented as hardware and/or a program code and processing unit for performing each function, and any two or more components may be combined into a single component.

Thus, in the following embodiments, it should be noted that components may be named not to physically distinguishing them but rather to represent their respective functions, and technical aspects of the present invention are not limited by names of components.

Uplink frequency control according to the present invention may be performed by a mobile terminal apparatus having the same configuration as in the embodiment of FIG. 7.

As described above, the mobile terminal apparatus according to the present invention may include the MAC layer processing unit 110, the baseband processing unit 120, and the RF processing unit 135. Here, the RF processing unit 135 may include the RF transmission unit 130, the RF reception unit 140, and the local oscillator 150, as described in FIG. 1.

The mobile terminal apparatus 100 according to the present invention includes a control unit 170 for controlling an uplink frequency other than the blocks described in FIG. 1. The control unit 170 is shown in FIG. 1 as operating together with the MAC layer processing unit 110, but it may control the MAC layer processing unit 110, the baseband processing unit 120, and the RF processing unit 135 so as to perform operations required for uplink frequency control according to the present invention.

More specifically, the control unit 170 measures a frequency offset of each downlink, calculates a difference between the measured frequency offsets of each downlink, derives a Doppler frequency offset component from the calculated frequency offset difference, and corrects an uplink frequency offset using the derived Doppler frequency offset component.

On the other hand, the control unit 170 may calculate a frequency drift component and a Doppler frequency offset component whenever measuring the frequency offset. That is, a measurement period of the frequency offset and a measurement period of the frequency drift component may be equally set. However, according to another embodiment of the present invention, the control unit 170 may set the measurement period of the frequency drift component to be sufficiently longer than the measurement period of the frequency offset including the Doppler frequency offset component.

Meanwhile, the control unit 170 may be provided in the form of a single block integrated with the baseband processing unit 120, and implemented so that a type including functions of other blocks shown in FIG. 7 or a part of the function is included in other blocks, as necessary.

As described above, according to the embodiments of the present invention, uplink frequency control using results of downlink frequency control can be performed in a terminal, and therefore RF signals transmitted from the terminal to a base station have better noise characteristics, thereby simplifying baseband design of the base station, and further improving uplink SNR performance.

Thus, according to the configuration of the present invention, a higher data rate can be ensured compared to an existing automatic frequency control method, and an RF central frequency can be more accurately predicted and controlled even in a rapidly changing wireless environment, so that a higher-order modulation method can be used to provide a higher data rate.

While example embodiments of the present invention and their advantages have been described in detail, it should be understood that various changes, substitutions, and alterations may be made herein without departing from the scope of the invention.

What is claimed is:

1. An uplink frequency control method, the method performed in a terminal having a first downlink and a first uplink with a first base station and a second downlink and a second uplink with a second base station, the method comprising:
    measuring a first downlink frequency offset with respect to the first downlink;
    measuring a second downlink frequency offset with respect to the second downlink; and
    correcting a frequency of the second uplink by using the measured first downlink frequency offset,
    wherein, the first downlink frequency offset includes a first frequency drift component and a first Doppler frequency component, and the second downlink frequency offset includes a second frequency drift component and a second Doppler frequency component,
    wherein the correcting includes:
        considering the measured first downlink frequency offset as a second uplink frequency offset; and
        correcting the frequency of the second uplink according to the considered second uplink frequency offset, and
    wherein the terminal is moving toward the second base station and moving away from the first base station.

2. The uplink frequency control method of claim 1, further comprising:
    considering the measured second downlink frequency offset as a first uplink frequency offset; and
    correcting a frequency of the first uplink according to the considered first uplink frequency offset.

3. The uplink frequency control method of claim 1, wherein the correcting
    is performed without calculating the first frequency drift component, the second frequency drift component, the first Doppler frequency component, and the second Doppler frequency component.

4. A mobile terminal apparatus having a first downlink and a first uplink with a first base station and a second downlink and a second uplink with a second base station, comprising:
    a control unit configured to measure a first downlink frequency offset with respect to the first downlink, measure a second downlink frequency offset with respect to the second downlink, and correct a frequency of the second uplink by using the measured first downlink frequency offset,
    wherein the control unit considers the measured first downlink frequency offset as a second uplink frequency offset, and corrects the frequency of the second uplink according to the considered second uplink frequency offset,
    wherein the first downlink frequency offset includes a first frequency drift component and a first Doppler frequency component, and the second downlink frequency offset includes a second frequency drift component and a second Doppler frequency component, and
    wherein the mobile terminal apparatus is moving toward the second base station and moving away from the first base station.

5. The mobile terminal apparatus of claim 4, wherein the control unit considers the measured second downlink frequency offset as a first uplink frequency offset; and corrects a frequency of the first uplink according to the considered first uplink frequency offset.

6. The mobile terminal apparatus of claim 4, wherein the control unit corrects the frequency of the second uplink without calculating the first frequency drift component, the second frequency drift component, the first Doppler frequency component, and the second Doppler frequency component.

* * * * *